Dec. 11, 1928.
H. L. WATSON
INCUBATOR
Filed Jan. 10, 1925  2 Sheets-Sheet 1
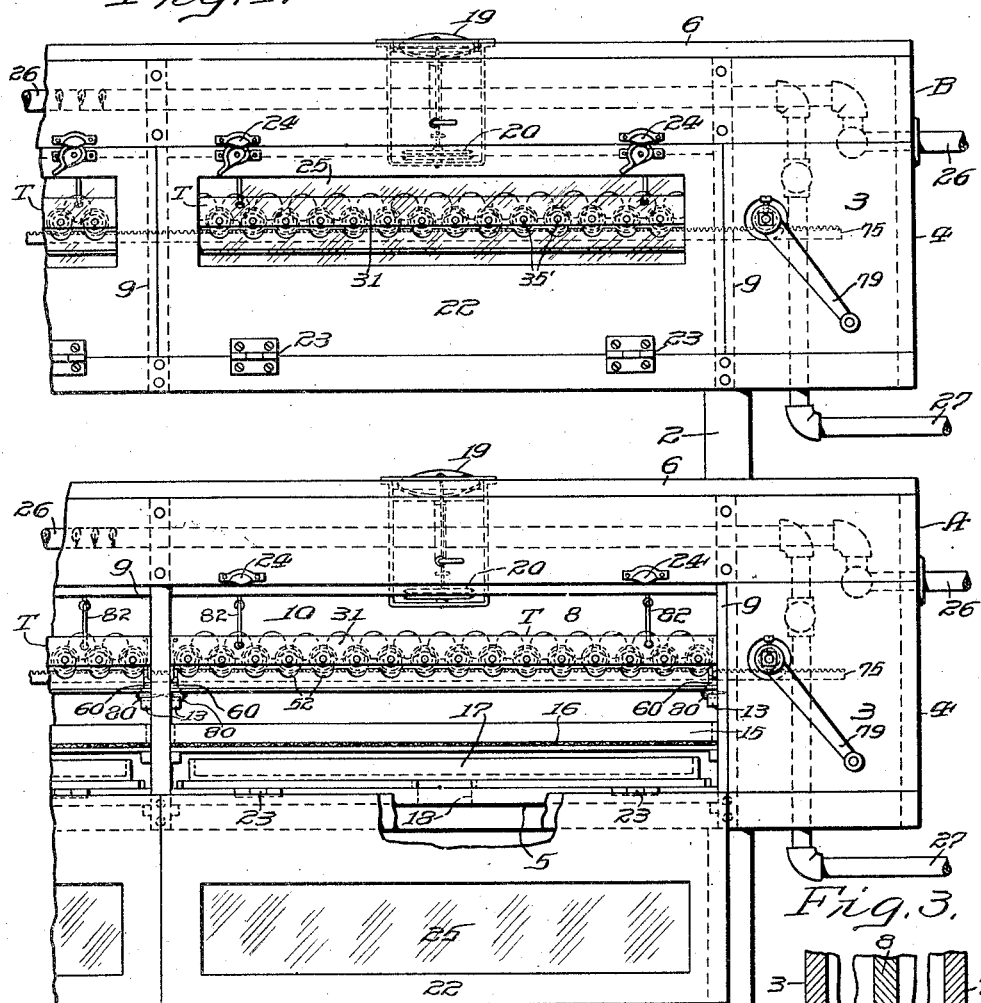
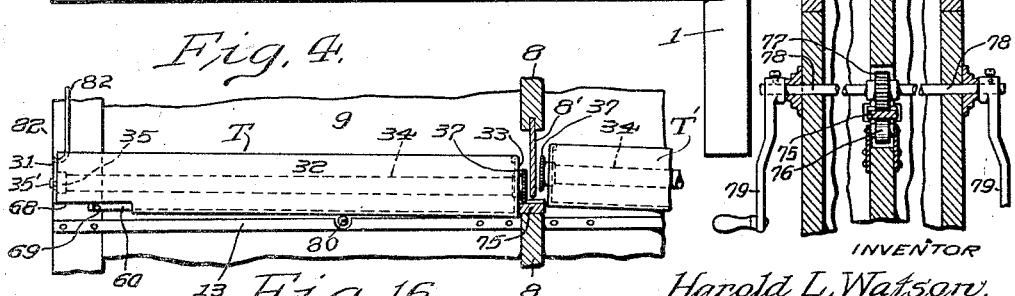

Dec. 11, 1928.
H. L. WATSON
INCUBATOR
Filed Jan. 10, 1925    2 Sheets-Sheet 2
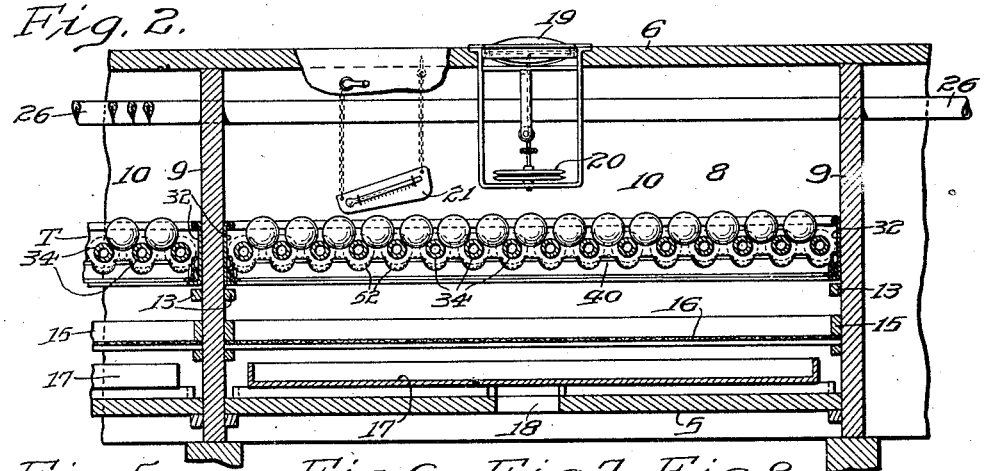
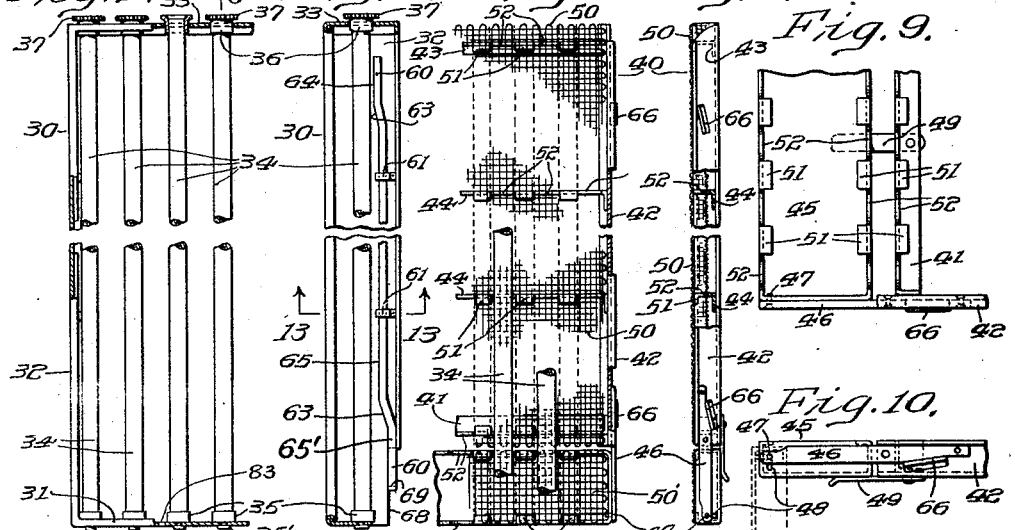
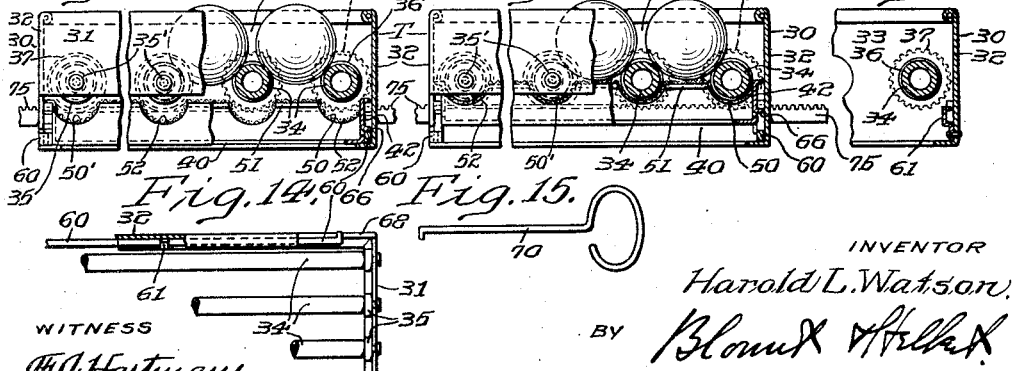
INVENTOR
Harold L. Watson
BY
ATTORNEYS
WITNESS Patented Dec. 11, 1928.

1,694,674

UNITED STATES PATENT OFFICE.

HAROLD L. WATSON, OF HIGHLAND PARK, NEW JERSEY, ASSIGNOR, BY MESNE ASSIGNMENTS, TO AMERICAN INCUBATORS, INC., OF NEW BRUNSWICK, NEW JERSEY, A CORPORATION OF NEW JERSEY.

INCUBATOR.

Application filed January 10, 1925. Serial No. 1,551.

The present invention relates more particularly to the trays in which the eggs, during the period of incubation, are supported, a principal object of the invention being to provide a tray of novel construction especially suitable for use in large incubators having a plurality of egg containing compartments, such incubators being ordinarily known as "mammoth" incubators. A further object of the invention is to provide a tray adapted for this purpose and embodying means operative in association with means arranged in the incubator casing and operable from the exterior thereof for turning the eggs in the tray at such times as may be requisite during the period of incubation and so arranged that when a plurality of the trays are employed, the eggs in all the trays may be turned simultaneously or only those in selected trays.

A further object of the invention is to provide an egg containing tray for an incubator comprising a frame operative to support a plurality of spaced, parallel, egg supporting rollers and a removable floor or support in association with means whereby the support may be readily raised or lowered with respect to the rollers so that the floor during the major part of the incubating period may be maintained in a position out of contact with the rollers and the eggs to permit the latter to be readily turned through suitable rotation of the rollers, and be raised with respect to the rollers during the hatching period to a position to support the eggs and provide a suitable floor on which the young chicks may stand after they have left the eggs.

A still further object is to provide, in a tray of the character aforesaid, a removable floor comprising a plurality of sections in association with means whereby one of said sections may be lowered to provide an opening in the floor through which the young chicks, after hatching, can pass out of the tray and into a suitable nursery chamber arranged beneath the tray but within the egg containing compartment.

Still further objects of the invention are to provide means in association with the tray for throwing the egg supporting rollers of the tray into or out of operative engagement with the roller actuating means, conveniently by inclining the tray toward or away from said means, thus enabling any given tray to be readily moved to a position in which its rollers will not be actuated by the roller actuating means when the same are operated, and preventing the turning of the eggs in that tray; to provide means whereby the floor of the tray may be readily raised from lowered to elevated position or vice versa when desired, and to provide an all metal incubator tray of simple form and construction and embodying a removable floor which may be readily removed from the tray to facilitate cleaning and disinfection thereof.

In addition to the foregoing objects, my invention further includes all of the other various objects and novel features of construction and arrangement hereinafter more particularly described or which will appear from the accompanying drawings forming a part hereof.

While it will be understood that my improved tray may be satisfactorily employed in small incubators embodying but a single egg containing compartment, it is more particularly intended for use in incubators having a plurality of compartments disposed adjacent each other, and in the said drawings I have illustrated a preferred embodiment of the invention in connection with such an incubator, the latter comprising two "decks" arranged in superposed spaced relation, each deck comprising a casing suitably divided midway between its front and back walls by a longitudinally extending partition and at spaced intervals by a plurality of transversely extending partitions, thus providing a plurality of compartments in the deck as will hereinafter more fully appear. Each of the compartments so formed is adapted to contain an egg tray in which the eggs are supported during the period of incubation, while each deck also embodies heating pipes extending longitudinally therethrough and supplied with hot water from a central source of supply for heating the compartments, and individual thermostatically controlled means for regulating the temperature in each compartment.

In the said drawings, Fig. 1 is a front elevation of one end of a double decked mammoth incubator of the general character to which reference has been made and showing my improved trays in position in certain of the compartments thereof, the doors to the compartments in the upper deck being shown in closed position and those in the lower deck in open position. Fig. 2 is a fragmentary, longitudinal vertical detail central section of one of the decks with certain parts shown in elevation, the floor of the tray being in lowered position and the eggs resting on the rollers. Fig. 3 is a transverse fragmentary section through the incubator illustrating the means for actuating the tray rollers in the egg turning operation. Fig. 4 is a fragmentary detail view, partially in vertical section, showing two of the trays in the incubator in association with the means for throwing the tray rollers into or out of engagement with the roller actuating means. Fig. 5 is a fragmentary top plan view of one of the trays with the tray floor removed; Fig. 6 is a transverse section on the line 6—6 in Fig. 5; Fig. 7 is a top plan view of one of the tray floors, fragmentary portions of some of the tray rollers being indicated; Fig. 8 is a side elevation of the tray floor shown in Fig. 7 removed from the tray; Fig. 9 is a detail fragmentary plan view of a portion of the tray floor with the wire netting removed; Fig. 10 is an end elevation of Fig. 9; Fig. 11 is a fragmentary detail view of the front of one of the trays, partially in elevation and partially in section, showing the eggs resting on the rollers and the tray floor in lowered position, and Fig. 12 is a similar view but showing the tray floor in raised position. Fig. 13 is a fragmentary enlarged detail section of the tray with the floor removed taken on the line 13—13 in Fig. 6, and Fig. 14 is an inverted, detail fragmentary bottom plan view of the tray with the floor removed. Fig. 15 is an elevation of a tool conveniently used in the operation of raising and lowering the floor of the tray, and Fig. 16 a fragmentary plan view of a part of the roller actuating rack. Like numerals are used to designate the same parts in the several figures.

Referring now more particularly to the drawings, the incubator illustrated in Fig. 1 comprises upper and lower decks generally designated as A and B; the lower deck being supported on legs 1 and the upper deck on posts 2 extending above the lower deck. As the decks are similarly arranged in all respects, a description of either will suffice for the other, and with this understanding and referring to either deck, the same comprises a front wall 3, end wall 4, bottom 5 and top 6, as well as a rear wall 7 corresponding to the front wall 3, thus providing a substantially rectangular casing. This casing is longitudinally, centrally divided by a partition 8 and by a plurality of transverse partitions 9 into a plurality of egg compartments 10 in each of which is disposed an egg tray generally designated as T and hereinafter more particularly described, said tray being partially supported from cleats 13 secured to the partitions 9 about midway between the top and bottom of the compartment. Beneath each tray and spaced therefrom is a nursery tray preferably comprising a generally rectangular open frame 15 having a wire mesh bottom 16, and beneath the nursery tray may be arranged a metallic moisture pan 17 which is designed to hold water and suitably moisten the air passing through the compartment. At the center of the bottom of each compartment an opening 18 may be provided through which fresh air can enter the compartment from the exterior of the incubator, while at some other suitable point as in the top of each compartment, another opening may be located conveniently controlled by a damper 19 preferably actuated by thermostatic regulating means of any suitable character, and generally designated as 20, for regulating the amount of air which can pass through the opening and out of the compartment. For showing the temperature of the compartment adjacent the eggs a thermometer 21 may be suitably suspended in each compartment, and for giving access to the interior of each compartment, the front and rear walls of the casing are provided with doors 22 each extending for substantially the entire length of the adjacent compartment and hinged as at 23 to drop downwardly when desired, catches 24 being operative to hold the doors in raised or closed position. Preferably each door may be provided with a glass 25 through which the interior of the compartment to which it gives access may be inspected without opening the door, while for heating the compartments, a plurality of suitable heating pipes 26 are extended therethrough and arranged to convey hot water from a central source of supply, return pipes 27 being provided for returning the water in the usual manner. It will be understood, however, that the various parts of the incubator hitherto described may be of any suitable form, construction or arrangement other than those illustrated if desired, and that the said parts are thus to be deemed as more or less conventionally shown in the drawings.

Each of the compartments is adapted to contain an egg tray preferably made of metal and comprising a rectangular open frame, generally designated as 30, having a front member 31, side members 32 and a rear member 33, the front and rear members being arranged to support the ends of a plurality of parallel laterally spaced rollers 34 conveniently formed of metal tubing. These rollers are respectively arranged for free axial rotation in the frame in any suitable manner, for example, as best shown in Figs. 5 and 6, by providing the forward end of each roller with a cap 35 having a central projecting stud 35′ which is extended through a hole drilled in the front member 31 and then headed over, and by providing the rear end of each roller with a sleeve 36 having a gear 37 formed in an outwardly directed flange at its rear end, the sleeve being adapted to extend through a hole in the member 33 and over the adjacent end of the roller to which the sleeve, as well as the cap, is secured by soldering or by frictional engagement, or in any other suitable way.

Each of the trays is provided with a removable sectional floor generally designated as 40 and best shown in Figs. 7 to 10 inclusive, and comprising a main section having a metal frame formed with a front member 41, side members 42 and rear member 43. This frame, which may be provided with longitudinally extending braces 44 if desired, is of generally rectangular form, slightly less in width than the inside width of the frame 30 and considerably less in length than the inside length of the frame 30 from front to back. The floor may also comprise a movable section having a rectangular, relatively narrow and elongated metal frame 45 which is disposed in front of and slightly spaced from the main section and hingedly supported from a pair of forwardly extending arms 46, riveted to the side members of the main section, by pins 47 extending through the arms and into slots 48 formed near the forward ends of the side members of the frame 45 in such manner that the latter may be swung from a position of parallelism with the main section to a position substantially at right angles thereto as indicated in Fig. 10 in dotted lines. For holding the hinged section 45 in raised position, suitable supporting clips 49 are pivoted to and beneath the front member 41 of the main section in such manner that they may be swung under the hinged section to hold it in raised position or swung out of engagement therewith to permit it to be swung downwardly.

Both sections of the floor frame are covered with wire netting respectively designated as 50 and 50', which is preferably of relatively coarse mesh and soldered or otherwise secured to lugs 51 with which the members of the frame and the supports 44 are provided, it being of course understood that the nettings 50 and 50' are respectively of a size to entirely cover the subjacent sections of the frame. In order to provide suitable recesses for the reception of the rollers 34 when the floor is in elevated position within the tray, the front and rear members of each section of the floor frame are cut away or "scalloped" on substantially semi-circular arcs as at 52 at suitably spaced intervals in alignment with the rollers and the nettings are provided with a plurality of parallel, spaced substantially semi-circular depressions as clearly shown in Fig. 11 conforming with the cut-away parts of the frame, so that when the nettings are secured to the frame, a series of parallel spaced grooves or depressions of substantially semi-circular cross section are presented, each depression adapted to receive the lower half of a roller, the said depressions being integrally connected by horizontally disposed, narrow, elongated strips of netting adapted to extend between the rollers when the latter are disposed in the depressions, as best shown in Fig. 11.

Means are provided for removably supporting the floor in the tray in such manner that it may be readily raised from normal position in which it is clear of the rollers, as shown in Fig. 11, to elevated position in which it is in contact with the rollers, as shown in Fig. 12, said means preferably comprising a slide 60 disposed adjacent the inner face of each of the frame members 32 and secured thereto by clips 61 in such manner that the slides may be moved horizontally forward or back with respect to the members 32 when desired. Each slide is provided with a plurality of inclined cam surfaces 63 which are disposed between and serve to connect horizontally extending supporting surfaces 64, 65 and 65' which thus lie in progressively lower horizontal planes with surface 64 above surface 65 and surface 65 above surface 65', all of said surfaces being adapted for co-operation with overhanging lugs 66 secured to the side members 42 of the main section of the tray floor. In order to permit convenient access to the forward ends of the slides, the side members 32 are cut away adjacent the front of the tray as at 68 so as to expose the ends of the slides (see Fig. 4), each of which may be turned over to provide a hook 69 of a form to be readily engaged by a tool 70 having a hook at one end, or by any other suitable instrument, thus enabling the slides to be readily pulled forward when desired. Conveniently, the side members 32 may be provided along their lower edges with an inwardly directed flange against which a portion of the lower edge of the adjacent slide is adapted to rest, thus affording support to the slide.

It will thus be apparent that the floor, when the slides are pushed rearwardly, may be slid into the lower part of the tray from front to back, the front member 31 of the tray frame being cut away along its lower edge as best shown in Figs. 11 and 12 sufficiently to permit this operation; that when so disposed in the tray the floor will be supported by engagement of the lugs 66 with the surfaces 65, 65' of the slides with the netting below and out of contact with the rollers as shown in Fig. 11, and that by pulling the slides forward the floor may be lifted through coaction of the cam surfaces 63 and the lugs until the latter pass onto the surfaces 64 and 65 to thereafter support the floor in elevated position with the depressions in the netting in contact or substantial contact with the rollers and the horizontal portions of the netting bridging the spaces therebetween.

During the progress of the hatch it is requisite to turn the eggs in each tray periodically, and means are provided for effecting this function by rotating the rollers in each tray through the medium of the gears 37, as well as means for maintaining any given tray or trays in the incubator in a position in which the gears carried by the rollers in that particular tray are out of engagement with the means by which the actuation of the gears is normally accomplished, so that all of the eggs in all of the trays may be simultaneously turned or any given tray or trays cut off and the eggs therein maintained stationary while the eggs in the other trays are turned. More particularly, and for accomplishing these several functions, I provide a longitudinally extending rack 75 having teeth in its upper face suitable for cooperation with the gears 37 and arrange the rack in such position that it will extend beneath the gears 37 when the trays are fully pushed into place in their respective compartments. In the form of incubator shown the tray compartments, as hitherto explained, are disposed back to back and side to side, and under these conditions I may arrange the rack in alignment with the partition 8 which may be divided vertically to provide the necessary space for the rack and for the adjacent gears of the trays, a thin partition 8' being arranged in the opening in the main partition between the adjacent faces of the gears of the trays, disposed in the front and rear compartments of the incubator so as to prevent the circulation of air from one compartment to the other as far as possible, the construction described being most clearly shown in Fig. 4. At suitable intervals the rack is suitably supported for longitudinal movement, preferably on rollers 76 mounted on brackets carried by the partition 8, and is made of sufficient length to extend adjacent each compartment and beyond the end compartments of the incubator where it is cooperative with a gear 77 mounted on a shaft 78 conveniently extending entirely through the incubator from front to back and provided on its projecting ends with cranks 79, by means of which the shaft and in turn the gear may be conveniently rotated in such manner as to move the rack longitudinally of the incubator and thus simultaneously effect the revolution of all of the gears 37 which may be in engagement with the rack.

Toward the end of the incubating period an egg should be kept stationary to produce the best results, and since the different compartments in a mammoth incubator are frequently filled with eggs or "set" at different times, it is thus requisite that means be provided for temporarily keeping the eggs in certain of the compartments stationary when the eggs in other compartments which have not been incubated for so long a time are turned, and for this purpose I preferably so arrange the trays in the incubator that the gears of any given tray may be thrown into or out of engagement with the rack when desired. To this end I may provide a pair of small rollers 80 mounted on the partitions forming the opposite ends of each compartment so as to respectively project under the side members 32 of the tray, the rollers being preferably arranged in the rear of the middle of the compartment and slightly above the supporting cleats 13 secured to the wall at each end of the compartment. By reason of the disposition of the rollers, when the tray is pushed all the way back in the compartment, it rests in a slightly downwardly and forwardly inclined position (see tray T' in Fig. 4) with the gears out of mesh with the rack 75, the front part of the tray being supported by the cleats 13. It will be apparent, however, that by raising the front part of the tray about the rollers as a pivot, the rear end of the tray may be lowered sufficiently to throw the gears into engagement with the rack, and for holding the tray in such position when desired I may provide suitable means such as depending hooks 82 adapted to cooperate with holes 83 in the front wall of the tray so that when the hooks are engaged therein the tray will assume the position shown at T in Fig. 4. Thus the tray may be raised so as to engage the gears with the rack or lowered so as to throw the gears out of mesh, thus temporarily cutting off that particular tray from coaction with the rack and preventing the turning of the eggs therein when the rack is moved.

In the operation of a mammoth incubator having a plurality of trays and constucted substantially in accordance with the embodiment of the invention hitherto described, the eggs are deposited in each tray when its floor is in lowered position and the tray, during the initial period of the hatch, maintained in a position in which the gears 37 are in contact with the rack so that when the latter is periodically moved longitudinally by rotation of one of the cranks 79, the rollers in that tray will be rotated to turn the eggs therein, it being of course understood that during this period the hinged section of the tray floor, if employed, is maintained in raised position. After a certain number of days it is no longer necessary to turn the eggs, and in fact, undesirable to do so, so that at expiration of this period the door of the compartment is opened and the front of the tray lowered by unhooking hooks 82 so as to throw the gears of that particular tray out of engagement with the rack.

Toward the termination of the incubation period or, if desired, at the time when the gears are thrown out of engagement with the rack, the slides 60 are pulled forward conveniently through the medium of the tool 70 or the like so as to elevate the floor and bring it adjacent or closely adjacent the rollers. This serves to eliminate the spaces theretofore existing between the rollers and the netting in which the chicks as they emerge from the eggs might readily be caught and provides a floor or surface comprising the strips of netting between the rollers and the upper halves of the rollers themselves on which they can safely move about after they are hatched. At the same time the hinged section of the floor may be lowered to provide an opening or passage through which the chicks can find their way downwardly into the nursery tray where they are allowed to congregate until all of the eggs are hatched and from which they are thereafter removed in the ordinary way.

It will be noted that by reason of the all metal construction of the tray and the ease with which the floor can be removed, the operation of cleaning and disinfecting the tray after the hatch and when the tray has been removed from the incubator, is greatly facilitated, and further, that the method of supporting the tray enables it to be very readily inserted or withdrawn from the incubator with a minimum amount of effort, while the use of the movable floor with its relatively movable sections in association with means for readily raising and lowering the floor with respect to the rollers so that the floor may be kept out of contact with the rollers and eggs during the initial period of the hatch and then raised so as to provide a suitable floor for the chicks during the hatching period marks a distinct advance in the art and is believed to be broadly novel.

While I have herein described with considerable particularity a preferred form of my invention as exemplified in a mammoth incubator having a plurality of compartments arranged side by side and back to back in each of its decks, I do not thereby desire or intend to limit the use of the invention to an incubator specifically of that character as the invention may be readily employed in connection with other forms of incubators, nor do I desire by reason of the foregoing description and illustration in the accompanying drawings to confine myself to any specific form, arrangement or construction of the several elements or parts, as numerous changes and modifications comprehended by the invention may be made therein if desired without departing from the spirit and scope of the invention as defined in the appended claims.

Having thus described my invention, I claim and desire to protect by Letters Patent of the United States:

1. A tray for an incubator comprising a frame, a plurality of laterally spaced rollers rotatably supported in the frame, a removable floor having a main section, a movable section hinged to the main section, and means for holding the movable section in alignment with the main section, and means comprising slides carried by the frame and provided with cam surfaces operative to raise or lower the floor with respect to the rollers to arrange the floor below and out of contact with the rollers to permit rotary movement of the same and to elevate the floor to a position adjacent the rollers to support the eggs and chicks during the hatching period.

2. A tray for an incubator comprising a frame, a plurality of laterally spaced rollers each supported for axial rotation in the frame, a floor having a main section and a movable section hinged thereto, a covering for each section formed to provide a plurality of depressions aligned with the rollers, and means for raising and lowering the floor with respect to the rollers when the floor is disposed in the tray to arrange the floor below and out of contact with the rollers to permit rotary movement of the same and to elevate the floor to a position adjacent the rollers to support the eggs and chicks during the hatching period.

3. A tray for an incubator comprising a frame, a plurality of laterally spaced rollers each supported for axial rotation in the frame, a floor having a main section and a movable section hinged thereto, a covering of wire netting extending over each section said coverings being formed to provide a plurality of spaced depressions respectively aligned with the rollers and substantially flat surfaces connecting the depressions, means for holding the hinged section parallel to the main section, and means for raising the floor from normal position out of contact with the rollers to an elevated position in which the rollers are partially disposed in said depressions.

4. A tray for an incubator comprising a frame, egg supporting means carried by the frame and a removable floor adapted to be positioned in the frame and having a relatively movable hinged section, one of the sections being movable out of its normal position to provide a passageway for the hatched chicks, and operating mechanism for raising and lowering the frame independently of the egg supporting means for maintaining said floor at different heights in the frame irrespective of the relatively adjusted position of said sections to arrange the floor below and out of contact with the rollers to permit rotary movement of the same and to elevate the floor to a position adjacent the rollers to support the eggs and chicks during the hatching period.

5. A tray for an incubator comprising an open rectangular frame, a plurality of rollers supported in said frame, a removable floor adapted to be positioned in the frame beneath the rollers said floor having a main section and a relatively narrow section hinged adjacent the front of the main section, and a covering over each of said sections, means for holding the hinged section in alignment with the main section and operative to permit the hinged section to be swung down at right angles to the main section, and means for maintaining the floor in a plurality of different positions with respect to the rollers irrespective of the relatively adjusted positions of the main and hinged sections to arrange the floor below and out of contact with the rollers to permit rotary movement of the same and to elevate the floor to a position adjacent the rollers to support the eggs and chicks during the hatching period.

6. A tray for an incubator comprising a frame, egg supporting means carried by the frame and a floor adapted for disposition in the frame and having a plurality of depressions in its upper surface adapted for the reception of said egg supporting means, and means for raising and lowering the floor with respect to said means.

7. The combination with an incubator having a plurality of separate egg containing compartments, of an egg tray disposed in each compartment each tray having a plurality of egg supporting rollers each provided with a gear, a rack extending longitudinally in the incubator, means operative to move the rack, means for normally supporting each of said trays with the gears of its rollers in engagement with the rack, and means for selectively supporting any of said trays in its respective compartment with the gears of its rollers out of engagement with said rack.

8. The combination with an incubator having an egg containing compartment, of an egg tray disposed in the compartment and provided with a plurality of egg supporting rollers extending from the front to the back of the tray each roller having a gear disposed adjacent one of its extremities, a rack extending in the incubator, means for actuating the rack, means for supporting the tray in the compartment in an inclined position with the gears of its rollers in engagement with the rack, and means for holding the tray in an oppositely inclined position in the compartment with the gears of its rollers out of engagement with the rack.

9. In an incubator having a plurality of aligned egg containing compartments arranged back to back and respectively accessible from the front and rear of the incubator, an egg tray in each of said compartments comprising a plurality of egg supporting rollers each roller provided with a gear and a rack extending longitudinally through the incubator and coooperative with said gears whereby movement of the rack is operative to actuate all of said gears simultaneously to turn the rollers in each of the trays.

10. In an incubator having a plurality of aligned egg containing compartments arranged back to back and respectively accessible from opposite sides of the incubator, an egg tray in each of said compartments comprising a plurality of egg supporting rollers, each of said rollers having a gear on the end thereof most nearly adjacent the center of the incubator, and a rack extending longitudinally through the incubator and substantially centrally thereof adapted for meshing engagement with said gears and movable from the exterior of the incubator to simultaneously rotate all of the gears which are meshed with the rack to thereby rotate the rollers connected therewith.

11. An incubator having a plurality of egg containing compartments, an egg containing tray movably positioned in each compartment, each tray having a plurality of egg supporting rollers each provided with a gear and a rack extending longitudinally through the incubator and adapted to mesh with the gears of the rollers in the different trays when said trays are moved to a predetermined position in their respective compartments, each of said trays being capable of movement to another position in its respective compartment in which position the gears of its rollers are disengaged from said rack and unaffected by movement thereof.

12. A tray for an incubator comprising a frame, a plurality of rollers supported in the frame, a floor, and manually operated mechanism movable to a plurality of positions to support the floor at different elevations to arrange the floor below and out of contact with the rollers to permit rotation of the latter and to elevate the floor to a position adjacent the rollers to support the eggs and chicks during the hatching period.

13. A tray for incubators comprising a frame, a plurality of spaced rollers rotatably supported in the frame, a removable floor comprising a frame and a foraminous covering therefor, and manually operated mechanism supporting the floor and adjustable to different positions for supporting the floor at different elevations to arrange the floor below and out of contact with the rollers to permit rotation of the latter and to elevate the floor to a position adjacent the rollers to support the eggs and chicks during the hatching period.

14. A tray for incubators comprising a frame, a plurality of laterally spaced rollers rotatably supported in the frame, a floor having a hinged section, means for holding the hinged section in substantially a horizontal position, and manually operated mechanism supporting the floor and the hinged section and movable to a plurality of positions to support the said floor and section at different elevations, to arrange the floor below and out of contact with the rollers to permit rotation of the same, and to elevate the same to a position adjacent the rollers to support the eggs and chicks during the hatching period.

15. The combination with an incubator having a compartment, of an egg tray removably disposed in the compartment and having a plurality of egg supporting rollers, each roller provided with a gear, means extending in the incubator adapted to engage said gears, and means for pivotally supporting the tray to permit the gears to swing into and out of engagement with the said gear engaging means, and means for supporting the tray with the gears in engagement with the said gear engaging means.

In witness whereof, I have hereunto set my hand this 5th day of January, 1925.

HAROLD L. WATSON.